Figure 1:
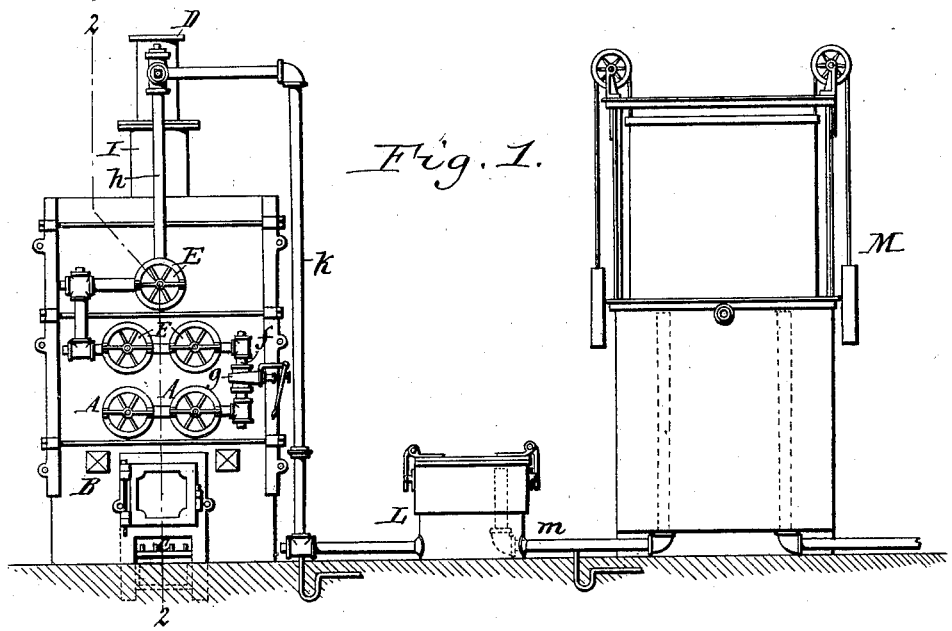

No. 609,582. Patented Aug. 23, 1898.
L. G. HARRIS.
PROCESS OF AND COMPOSITION FOR MAKING GAS.
(Application filed Aug. 18, 1897.)
(No Model.)

Witnesses:
Henry L. Deck.
Chas. F. Burkhart.

Louis G. Harris, Inventor.
By Wilhelm Bonner, Attorneys.

UNITED STATES PATENT OFFICE.

LOUIS G. HARRIS, OF TORONTO, CANADA.

PROCESS OF AND COMPOSITION FOR MAKING GAS.

SPECIFICATION forming part of Letters Patent No. 609,582, dated August 23, 1898.

Application filed August 18, 1897. Serial No. 648,694. (No specimens.)

*To all whom it may concern:*

Be it known that I, LOUIS GIBSON HARRIS, a subject of the Queen of Great Britain, residing at Toronto, in the county of York, Province of Ontario, Dominion of Canada, have invented a new and useful Improvement in the Manufacture of Gas from Garbage, &c., of which the following is a specification.

This invention has reference principally to the utilization of kitchen-garbage for producing by distillation a gas which is suitable for fuel and illuminating purposes, but is also applicable to the utilization of night-soil, manure, sawdust, and similar materials.

According to the best manner known to me for practicing my invention I add to the garbage or other gas-producing material before distilling the same a composition of matter which renders the distillation nearly uniform, facilitates and expedites the production of gas, increases the yield or volume of gas, produces a comparatively pure and rich gas, and enables the gas to be distilled off at a low temperature in the retorts. This composition of matter is best prepared as follows:

I prepare a liquid mixture containing caustic alkali—for instance, caustic soda—chlorid of lime, and ground or powdered soap-bark. I prefer alcohol as the liquid ingredient of the mixture, because it absorbs the solid ingredients more quickly than water, but water may be used. I prefer to use the ingredients in about the proportion of two quarts of alcohol, four pounds of caustic alkali, eight pounds of chlorid of lime, and three-quarters of a pound of powdered soap-bark. When water is used instead of alcohol, about two gallons of water may be used. If desired, alcohol and water may both be used in the mixture. I then add this mixture to about one hundred gallons of a suitable liquid hydrocarbon, preferably petroleum or a light petroleum derivative. I prefer for this purpose the light petroleum product known as "gas-oil." The total quantity of liquid so produced is sufficient for admixture with sixteen thousand pounds of garbage or other gas-producing material. These quantities and proportions are given only approximately and as illustrative and may be varied more or less as circumstances or the nature of the materials may require; but I have found that the above-stated proportion of this liquid to the garbage or other gas-producing material, which is about as one to twenty, gives very good results. The garbage or other gas-producing material is thoroughly mixed with this liquid, preferably by passing the garbage in its wet state, as it is collected, through a mixing-machine, which is provided with an agitator and with a spraying device by which the liquid is sprayed upon the garbage. The mixture is then distilled in retorts of any suitable construction, and the gas so produced is preferably subjected to the action of a superheater on its way from the retort to the gasometer and purified in any well-known or suitable way.

The above-named ingredients, which are added to the liquid hydrocarbon, prevent the latter from being distilled off at once, but maintain such a connection of the same with the garbage or other gas-producing material that the various ingredients of the mixture of which this liquid forms but a small part are gradually and simultaneously distilled, thereby equalizing the distillation and effecting a complete distillation of the material and a continuous and copious flow of gas while the distillation continues. These ingredients also cause the production of a gas which is comparatively pure and of high illuminating power and shorten the period of distillation and enable the distillation to be carried on at a comparatively low temperature.

While I prefer to employ in the distilling composition all of the ingredients mentioned, as they produce by their joint effect the best results, some may be omitted when a less perfect result is sufficient. For instance, fairly good results can be obtained by omitting the soap-bark and the chlorid of lime.

The caustic alkali is particularly effective in equalizing the distillation by preventing the liquid hydrocarbon from being distilled off at the beginning and in maintaining such a connection of this hydrocarbon with the garbage that all the ingredients are gradually and simultaneously distilled off and a uniform and rich gas is produced. The chlorid of lime and the soap-bark increase still further the volume and the candle-power of the gas and assist in shortening the time required for distilling a charge.

The gas produced according to my invention is very satisfactory for illuminating and heating purposes and is produced at very low cost, while the garbage or other refuse is disposed of in a sanitary and profitable manner.

The accompanying drawings illustrate apparatus which may be used for practicing my invention; but I do not wish to limit myself to apparatus of any particular construction.

Figure 2:
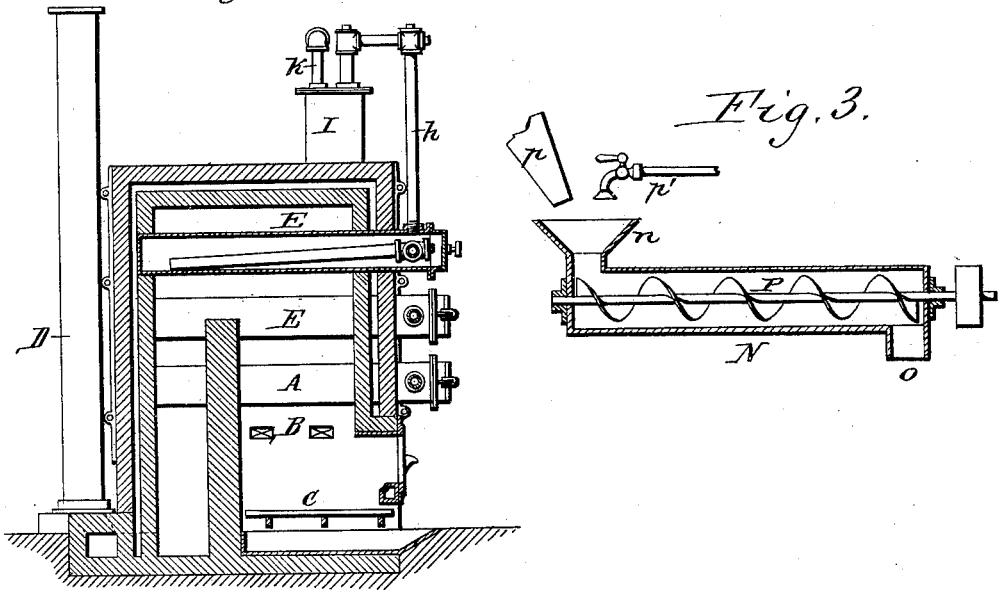
Figure 3:
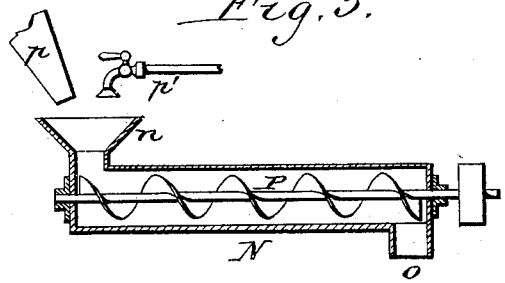

Figure 1 is a front elevation of the distilling apparatus. Fig. 2 is a longitudinal section in line 2 2, Fig. 1. Fig. 3 is a longitudinal vertical section of the mixing apparatus.

Like letters of reference refer to like parts in the several figures.

A A represent two retorts for distilling the garbage, arranged side by side in a heating-chamber B, having a fireplace C and a smoke-stack D and constructed in any suitable manner.

E represents superheating-retorts arranged in the same heating-chamber above the distilling-retorts A and receiving the gas therefrom through a pipe $f$, provided with a stop-cock $g$. The gas generated from the garbage in the distilling-retorts A passes successively through the superheating-retorts E, of which three are shown, and passes from the highest of these retorts by a pipe $h$ to a tar-receiver I. The gas passes from the latter by a pipe $k$ to a purifier L, and from the latter by a pipe $m$ to a gasometer M.

An apparatus for mixing the garbage with the carbureting and equalizing liquid is shown in Fig. 3, and consists of a horizontal cylindrical casing N, having at one end a feed-hopper $n$ and at the other end a delivery-spout $o$, a screw conveyer P, arranged within the casing, a feed-spout $p$ for the garbage, and a feed-pipe $p'$ for the liquid.

I claim as my invention—

1. The herein-described method of manufacturing a combustible gas from garbage and similar materials which consists in distilling such material mixed with a liquid hydrocarbon, such as mineral oil, and an equalizing ingredient whereby the distillation is expedited and rendered uniform, substantially as set forth.

2. The herein-described method of manufacturing a combustible gas from garbage and similar materials which consists in distilling such material mixed with a liquid hydrocarbon, such as mineral oil, and alkali, substantially as set forth.

3. The herein-described method of manufacturing a combustible gas from garbage and similar materials which consists in distilling such material mixed with a liquid hydrocarbon, such as mineral oil, alkali, chlorid of lime and soap-bark, substantially as set forth.

4. A composition of matter for admixture with garbage and other materials, consisting of a liquid hydrocarbon, such as mineral oil, and an equalizing ingredient whereby the action is equalized and expedited and the hydrocarbon is prevented from being prematurely distilled off, substantially as set forth.

5. A composition of matter for admixture with garbage and other materials, consisting of a liquid hydrocarbon, such as mineral oil, alkali, chlorid of lime and soap-bark, substantially as set forth.

Witness my hand this 12th day of August, 1897.

LOUIS G. HARRIS.

Witnesses:
JNO. J. BONNER,
KATHRYN ELMORE.